United States Patent
Chen (10) Patent No.: US 8,328,408 B2
(45) Date of Patent: Dec. 11, 2012

(54) LAMP POSITIONING DEVICE AND THE BACKLIGHT MODULE USING THE SAME

(75) Inventor: Ben-Hon Chen, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 599 days.

(21) Appl. No.: 12/582,943

(22) Filed: Oct. 21, 2009

(65) Prior Publication Data
US 2010/0097784 A1    Apr. 22, 2010

(30) Foreign Application Priority Data

Oct. 22, 2008 (TW) .............................. 97140418 A (51) Int. Cl.
*F21V 7/04* (2006.01)
(52) U.S. Cl. ...................................... 362/634; 362/97.1
(58) Field of Classification Search .................. 362/260, 362/225, 227, 235, 244, 27, 600, 611, 614, 362/631–634, 559, 561, 821; 248/689, 50, 248/62, 510, 200–201, 205.1, 207, 218.4, 248/309.1, 310, 311.2, 312, 313–314, 316.1
See application file for complete search history.

(56) References Cited

U.S. PATENT DOCUMENTS

| | | | |
|---|---|---|---|
| 6,722,773 B2 | 4/2004 | Tsai et al. | |
| 6,796,678 B2 | 9/2004 | Moon | |
| 6,960,002 B2 | 11/2005 | Tsai | |
| 7,052,169 B2 | 5/2006 | Mai et al. | |
| 7,137,726 B2 | 11/2006 | Lee et al. | |
| 7,232,952 B2 | 6/2007 | Lin et al. | |
| 2007/0053171 A1 | 3/2007 | Park | |
| 2007/0139911 A1 | 6/2007 | Yang et al. | |
| 2008/0025045 A1 | 1/2008 | Mii | |
| 2008/0310174 A1 | 12/2008 | Hsu | |

FOREIGN PATENT DOCUMENTS

| | | |
|---|---|---|
| CN | 101078505 | 11/2007 |
| JP | 9326207 | 12/1997 |
| TW | I277807 | 4/2007 |

OTHER PUBLICATIONS

Chinese language office action dated Nov. 20, 2009.
English language translation of abstract of TW I277807.
English language translation of abstract and pertinent parts of CN 101078505 (published Nov. 28, 2007).
English language translation of JP 9326207 (published Dec. 16, 1997).
English language translation of abstract of TW M297436.
Taiwan Office Action dated Mar. 8, 2011.

*Primary Examiner* — Anne Hines
(74) *Attorney, Agent, or Firm* — McClure, Qualey & Rodack, LLP (57) ABSTRACT

The present invention provides a lamp positioning device and a backlight module using the lamp positioning device for holding lamps. The lamp positioning device includes an upper arm and a lower arm, wherein a holding space is formed between the upper arm and the lower arm for accommodating the lamp. Furthermore, at least one of the upper arm and the lower arm has elasticity and thus can provide the lamp with resistance against shock in order to avoid being cracked or shattered.

22 Claims, 10 Drawing Sheets

LAMP POSITIONING DEVICE AND THE BACKLIGHT MODULE USING THE SAME

BACKGROUND OF THE INVENTION

1. Field of the Invention

The present invention relates to a lamp-positioning device and the backlight module using the same; most specifically to a lamp-positioning device used in a backlight module of a liquid crystal display.

2. Description of the Prior Art

In recent years, liquid crystal displays has become the mainstream in various types of display devices. Liquid crystal displays are extensively used in electronic products such as home televisions, monitors of personal computers and laptop computers, display screens of mobile phones and digital cameras. In liquid crystal displays, the backlight modules are used to provide bright and evenly distributed light for the liquid crystal display to display desired images. The backlight modules include edge-lighting backlight module and bottom-lighting backlight module respectively suitable for liquid crystal displays of different sizes.

Figure 1A:
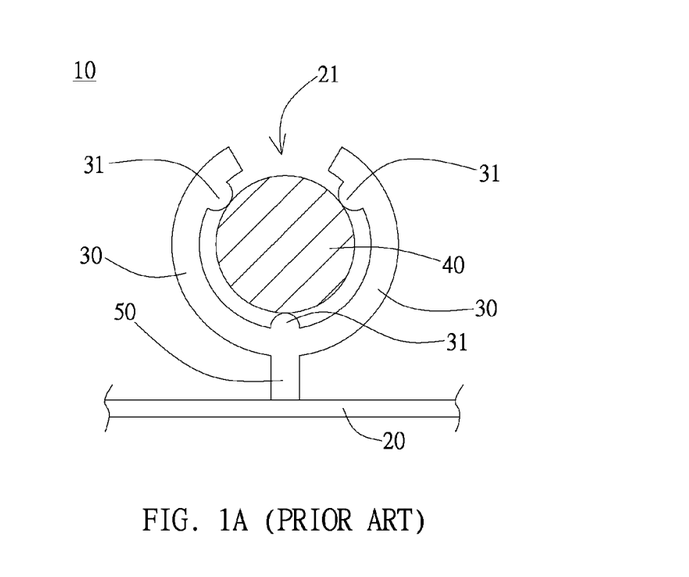
FIG. 1A and FIG. 1B illustrate a lamp-holding device 10 of a conventional backlight module.
Figure 1B:
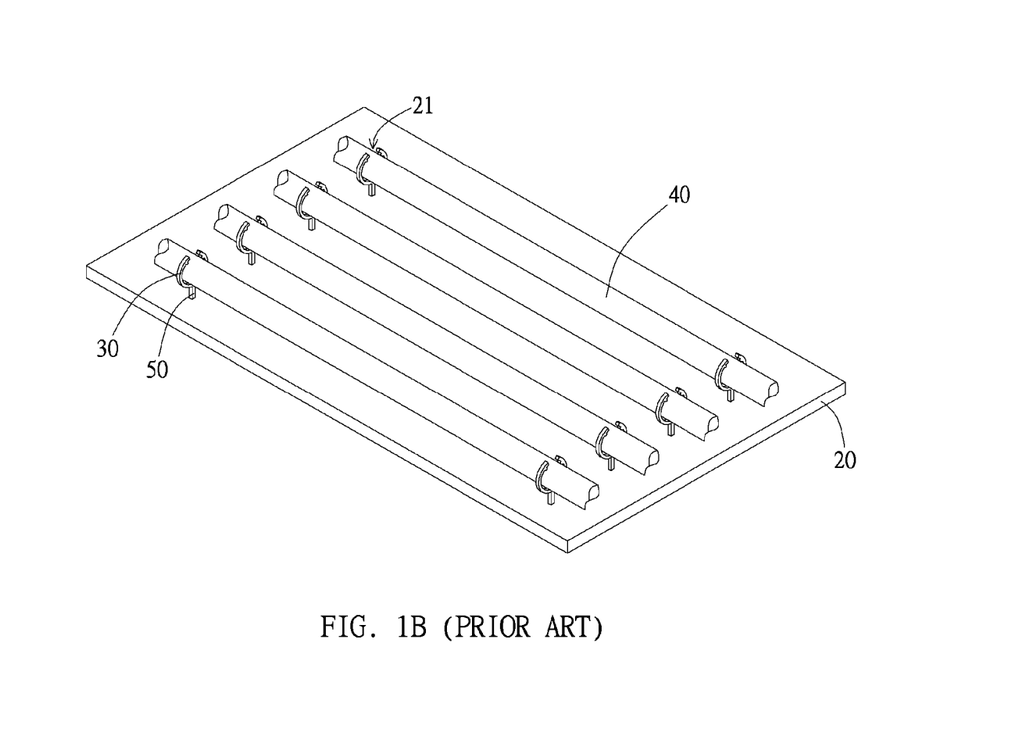

FIG. 1A and FIG. 1B illustrate a lamp-holding device 10 of a conventional backlight module. The lamp-holding device 10 includes a base 20, two arms 30 and a stand 50, wherein the stand 50 is connected to and extends from the base 20. Two arms 30 are both connected to the stand 50 and also bend respectively to form an arch. A plurality of protrusions 31 are formed on the inner surface of the arms 30 for contacting a lamp 40. In other words, a holding space 21 is formed between the protrusions 31. Afterward the lamp 40 passes through the opening between two arms 30 and is then positioned in the holding space 21 while making contacts with the protrusions 31.

The lamp 40 used in backlight module is vulnerable to vibration and shock which cause the lamp to crack or deviate. Thus the lamp 40 should be fixed to the lamp-holding device and operated with the optical films in order to provide bright and evenly distributed light. The tolerance in manufacturing the conventional lamp-holding devices, such as different in molds used, may create deviation in the sizes of conventional lamp-holding devices. In other words, sizes of the holding spaces 21 and sizes of the opening between two arms 30 may deviate.

If the holding space 21 is much smaller than the lamp, due to manufacturing tolerance. The lamp may be tightly grasped and thus may easily crack or break due to vibration or shock. Furthermore, the tightly grasped lamp may have inefficient heat dispersion because the lamp-holding device is held too close to the lamp; the resultant accumulation of heat may create dark spot in the lamp. On the other hand, if the size of holding space 21 is much greater than that of the lamp then excessive space may occur between the holding space and the lamp. Thus the lamp may move due to high frequency vibration within the backlight module which creates noises due to collision between the lamp and the lamp-holding device.

Furthermore, a lamp port is formed between two arms 30 and the tolerance in manufacturing of lamp-holding device may result in a lamp port whose diameter is much smaller than that of the lamp. Thus before the lamp is placed in the holding space, the lamp has to enter the lamp port by pushing the arms outward. In this way, the lamp may crack or cause the arms to deform due to excessive force during assembly. On the other hand, if the lamp port is enlarged due to tolerance in manufacturing, it will be difficult for the lamp-holding device to hold the lamp firmly. The lamp may be escape through the lamp port due to vibration and shock and thus causes damages to the lamp.

The above-mentioned situations can all create inconvenience in backlight module assembly and even damages to the element used in the backlight module. The above-mentioned situations can increase the assembly hours required and the associated production costs and can also reduce the life of lamp as well as the quality of overall products.

SUMMARY OF THE INVENTION

It is an object of the present invention to provide a lamp-positioning device for holding a lamp and acting as a cushion in order to reduce the shock exerted on the lamp.

It is another object of the present invention to provide a lamp-positioning device for holding the lamp and having only part of the lamp-positioning device in contact with the lamp.

It is yet another object of the present invention to provide a lamp-positioning device having flexible arms for compensating the tolerance in sizes during production.

It is yet another object of the present invention to provide a lamp-positioning device for reducing the damages on the lamp or the lamp-positioning device caused by excessive force during assembly.

It is another object of the present invention to provide a backlight module using the lamp-positioning device, wherein the backlight module has lamps of longer life and also requires less assembly time.

In order to hold the lamp for providing light source in a backlight module, the lamp-positioning device of the present invention includes an upper arm, a lower arm and a base, wherein the upper arm and the lower arm are connected to different locations of the base. At least one of the upper arm and the lower arm is elastic.

A plurality of first protrusions and second protrusions are respectively distributed on the inner surfaces of the upper arm and the lower arm and are distributed in a circle. A space is formed between the first protrusions and the second protrusions for a lamp to be held in the lamp-positioning device. The upper arm includes a distal end and the lower arm further includes a bulge portion. A lamp port is formed between a distal end and the bulge portion for the lamp to pass through and then enter the space between the first protrusions and the second protrusions.

Furthermore, the present invention also includes a backlight module which can be used in a display. The backlight module also includes a lamp and the lamp-positioning device, wherein the lamp-positioning device can be disposed on opposite sides of the casing of the backlight module to two ends of the lamp. However, in different embodiments, the lamp-positioning device can be disposed on the middle section of the backlight module to increase the stability of lamp. The upper arm and the lower arm of the lamp-positioning device can be formed directly on the casing. In other words, the base of lamp-positioning device can be replaced by the casing the backlight module.

DETAILED DESCRIPTION OF THE PREFERRED EMBODIMENT

The present invention can be implemented in embodiments of different forms. The drawings and the contents below serve as explanation of preferred embodiments of the present invention. Please also understand that the present specification discloses exemplary embodiments of the present invention and does not intend to limit the present invention to the drawings or specific embodiments disclosed.

The present invention provides a lamp-positioning device for holding a lamp and maintaining the lamp at a fixed position. The lamp-positioning device preferably includes materials such as polycarbonate (PC) or acrylonitrile-butadiene-styrene (ABS), but is not limited thereto. The lamp-positioning device can also include plastic materials or other suitable materials. Furthermore, the lamp-positioning device of the present invention is preferably manufactured by injection molding or other molding processes. People of ordinary skill and knowledge in the field can select the appropriate processes based on their own requirements. In preferred embodiments, the lamp includes cold cathode fluorescent lamps (CCFL), but is not limited thereto. The lamp held by the lamp-positioning device can include external electrode fluorescent lamp (EEFL) or other suitable lamps. The present invention also provides a backlight module using the lamp-positioning device and implemented in display devices. For instances, the backlight module of the present invention can be implemented in display devices of consumer electronics such as home televisions, personal computers, laptop computers, mobile phones and digital cameras. However, in different embodiments, the backlight module can be implemented in billboard or other devices requiring light sources. In preferred embodiments, the backlight module includes bottom-lighting backlight module but is not limited thereto; in different embodiments, the backlight module can include edge-lighting backlight module or other devices used to hold lamp.

Figure 2A:
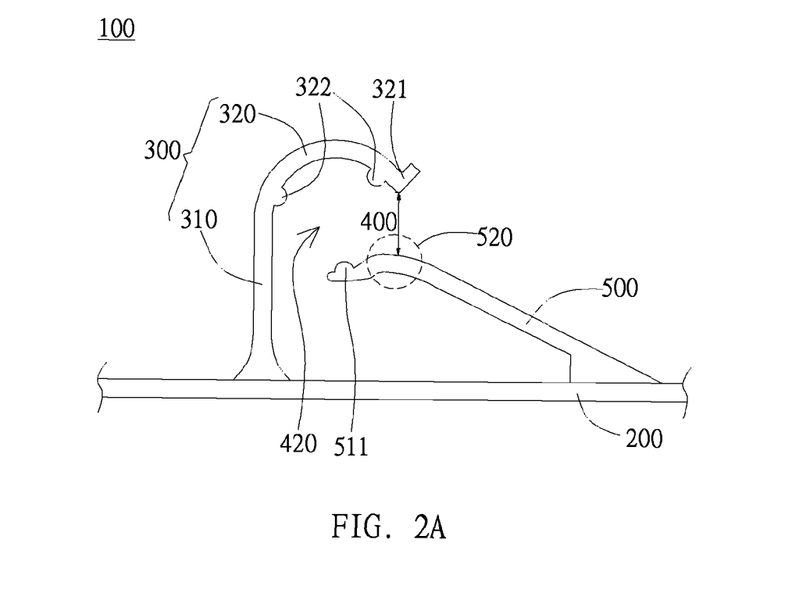
FIG. 2A is a side view of a preferred embodiment of the lamp-positioning device of the present invention.
Figure 2B:
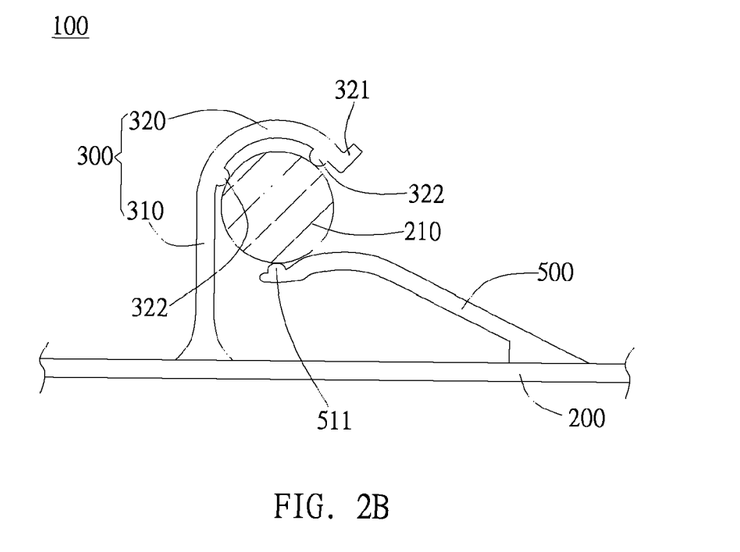
FIG. 2B is another side view of the embodiment of the lamp-positioning device illustrated in FIG. 2A, wherein a lamp is held by the lamp-positioning device.

FIG. 2A and FIG. 2B are perspective views of a preferred embodiment of the lamp-positioning device 100 of the present invention. As FIG. 2A and FIG. 2B show, the lamp-positioning device 100 includes a base 200, an upper arm 300 and a lower arm 500, wherein the base 200 is preferably a flat panel. One end of the upper arm 300 and one end of the lower arm 500 are connected to different locations of the base 200. The upper arm 300 includes a stand 310 and a distal end 320, wherein the stand 310 extends from the base 200. In the present embodiment, the stand 310 extends substantially perpendicularly from the base 200, but is not limited thereto. The stand 310 can extend from the base 200 in different angles of choice. For instance, the stand 310 can extend obliquely from the base 200 in 30°. The distal end 320 is essentially an extension from the stand 310. The distal end 320 is free and arches over the base 200. In other words, the distal end 320 is not fixed and arches toward the base 200. In preferred embodiment, the distal end 320 has a first guiding surface 321 for guiding a lamp 210 to pass through a lamp port 400. In the present embodiment, the distal end 320 further includes at least first protrusion 322 disposed on the inner surface of the distal end 320. When a lamp 210 is held by the lamp-positioning device 100, the lamp 210 will contact the first protrusion 322 of the upper arm 300. The first protrusion 322 is used to reduce the contact area between the lamp-positioning device 100 and the lamp 210. Furthermore, in the present embodiment, the stand 310 is straight in shape and the distal end 320 is curved, but is not limited thereto.

In the embodiment illustrated in FIG. 2A and FIG. 2B, the lower arm 500 is a cantilever extending from the base 200 and being between the distal end 320 and the base 200. In preferred embodiment, the lower arm 500 extends from the base 200 in angle substantially between 10° and 50°, but is not limited thereto. The lower arm 500 can extend from the base 200 in other angles or manner (in straight line or obliquely) corresponding to the distal end 320. Furthermore, in preferred embodiment, the lower arm 500 can include at least one second protrusion 511 disposed on the lower arm 500, for reducing the contact between the lamp-positioning device 100 and lamp 210. When the lamp 210 is held by the lamp-positioning device 100, the lamp 210 will make contact with the second protrusion 511. As FIG. 2A and FIG. 2B show, the first protrusions 322 and the second protrusion 511 are distributed in a circle. A space enclosed by the first protrusion 322 and the second protrusion 511 defines a holding space 420. The lamp 210 passes through the lamp port 400 and is then held within the holding space 420. As for the distribution of first protrusion 322 and second protrusion 511, if the centre of the holding space 420 is used as a reference, then the angle between every two adjacent protrusions is less than 180°. For instance, in the present embodiment, the angle between adjacent protrusions is 120°, but is not limited thereto. Angle between two adjacent protrusions can include other angles. Furthermore, the angles between adjacent protrusions can be unevenly distributed. For instance, the locations of the first protrusion 322 and the second protrusion 511 can be adjusted to create different angles between adjacent protrusions. The number of protrusions disposed and their locations can be selectively adjusted by people of ordinary skill and knowledge in the field.

Furthermore, as FIG. 2A and FIG. 2B show, the lower arm 500 includes a bulge portion 520 formed on the upper surface of the lower arm 500. The lamp port 400 is formed between the distal end 320 and the bulge portion 520, for the lamp 210 to pass through and then enter the holding space 420. The width of lamp port is slightly smaller than a diameter of the lamp 210. Thus when pushed toward the lamp port 400, the lamp 210 is guided by the first guiding surface 321 to enter the holding space 420. The size of lamp port 400 is smaller than that of the lamp 210, thus the lamp 210 will slight push the distal end 320 or the lower arm 500 to slightly extend the lamp port 400. The lamp 210 can then pass through the lamp port 400 and then makes contact with the first protrusion 322 and the second protrusion 511. In this way, the lamp 210 is held in the holding space 420 of the lamp-positioning device 100. In other words, when the lamp 210 is about to enter the lamp port 400, the lamp 210 will push either the distal end 320 away from the base 200 or push the lower arm 500 towards the base 200. The lamp 210 can also simultaneously push the distal end 320 and the lower arm 500 to slightly enlarge the lamp port 400; in other words, the width of the lamp port 400 will be slightly extended. In the present embodiment, the upper arm 300 having an arched distal end 320 is made of plastic material having elasticity. Thus the upper arm 300 is elastic and can be slightly bent without cracking or breaking. The lower arm of the present embodiment is a cantilever made of plastic material having elasticity. Thus the lower arm 500 of the present embodiment is also elastic and can be slight bent by the lamp 210 without cracking or breaking. Thus at least one of the upper arm 300 and lower arm 500 of the present embodiment is elastic or has elastic structure, but is not limited thereto and can be adjusted if required. Furthermore, the material of the upper arm 300 and the lower arm 500 can be adjusted or changed if required.

Figure 3A:
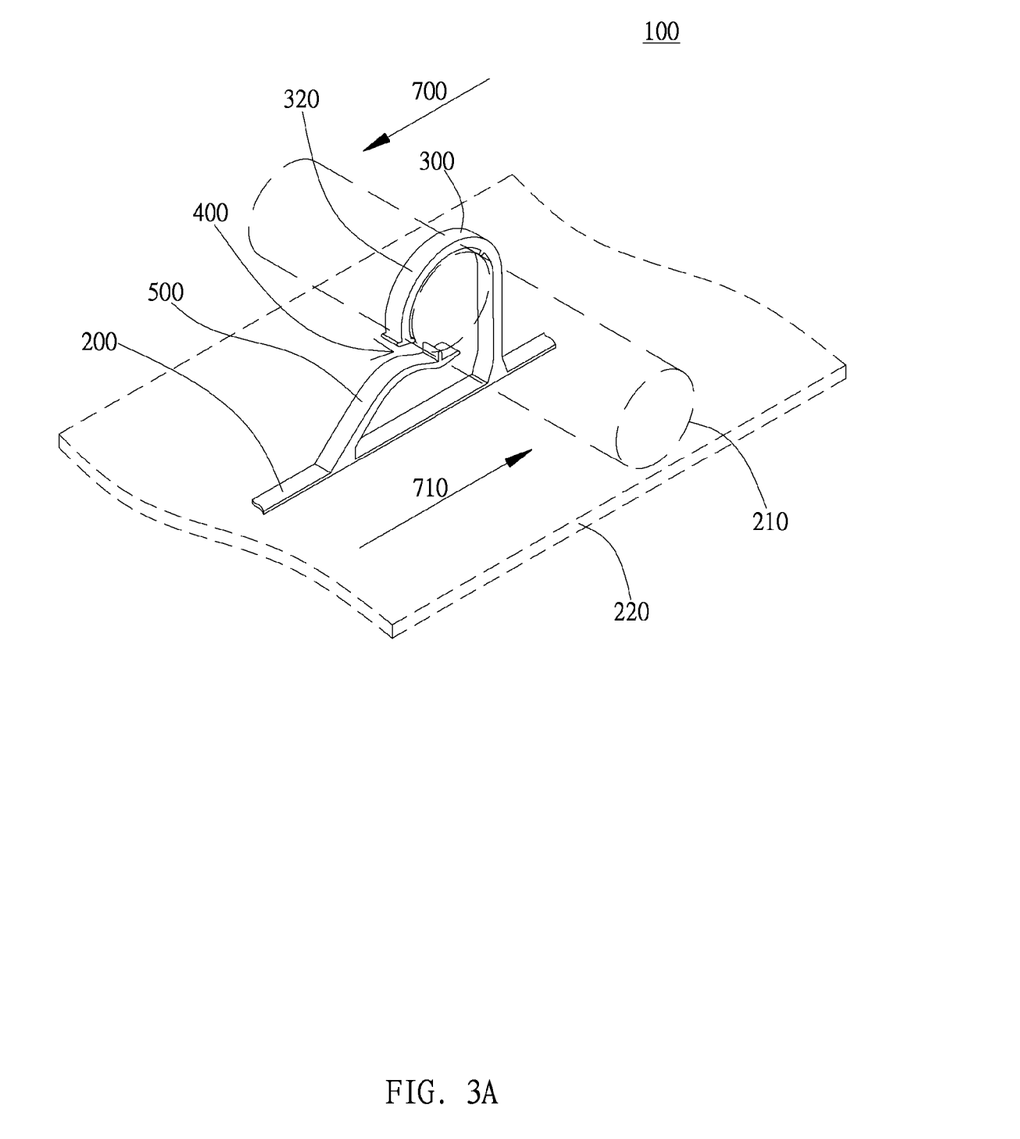
FIG. 3A illustrates a three dimensional view of the lamp-positioning device illustrated in FIG. 2A and FIG. 2B.

FIG. 3A illustrates a three dimensional view of the embodiment illustrated in FIG. 2A and FIG. 2B. As FIG. 3A shows, the lamp 210 is held between the upper arm 300 and the lower arm 500, wherein a projection plane 220 is formed and parallel with the base 200. As FIG. 3A shows, the projection of the upper arm 300 and the lower arm 500 on the projection plane respectively has a first direction 700 and a second direction 710. Most specifically, the distal end 320 extends from the base 200 and its extending direction on the projection plane 220 is defined as the first direction 700. The lower arm 500 extends from the base 200 and its extending direction on the projection plane 220 is defined as the second direction 710, wherein the first direction 700 and the second direction 710 are different. In other words, on the projection plane 220 parallel with the base 200, the upper arm 300 extends from the base 200 toward the lamp port 400 in a direction different from that of the lower arm 500 extending from the base 200 toward the lamp port 400. In the present embodiment, the first direction 700 and the second direction 710 are parallel and collinear, but are not limited thereto and can be adjusted if required. For instance, in other embodiments, the first direction 700 and the second direction 710 on the projection plane 220 can intersect each other. Furthermore, in the present embodiment, the first direction 700 and the second direction 710 are substantially perpendicular to the extending direction of the lamp 210.

Figure 3B:
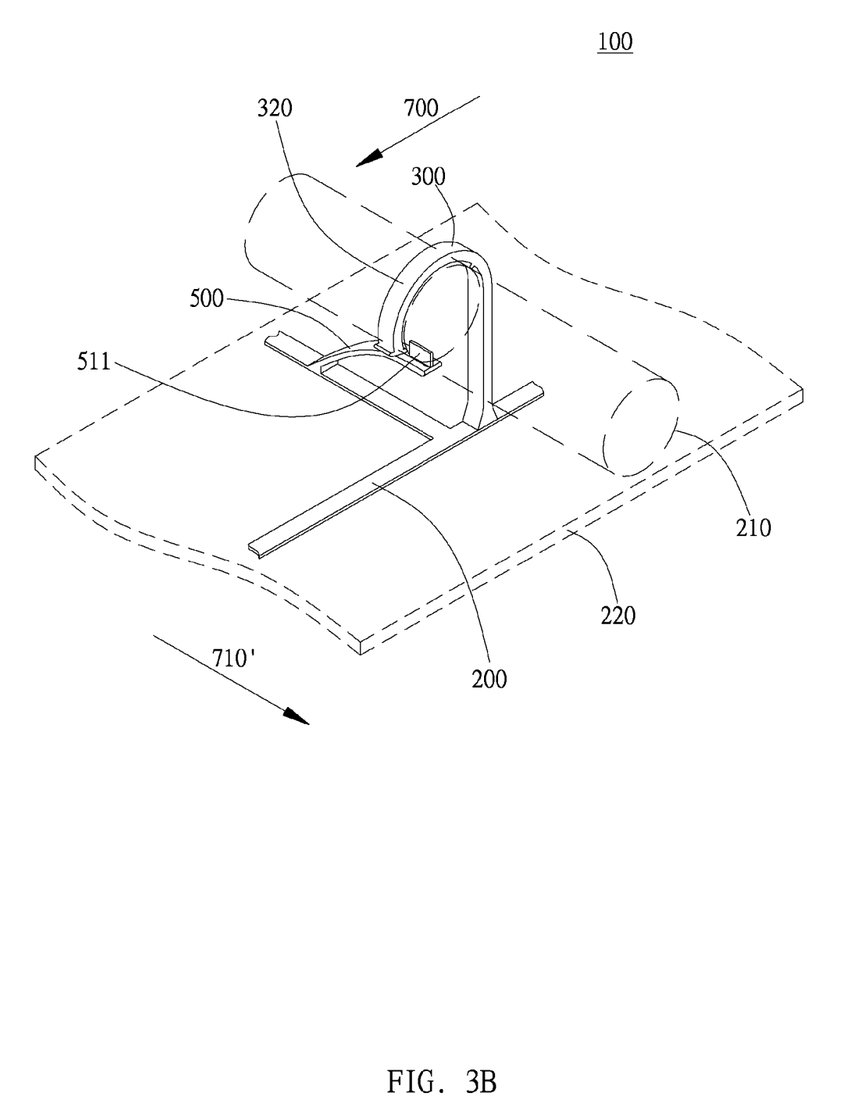
FIG. 3B illustrates a variation of the lamp-positioning device illustrated in FIG. 3A.

FIG. 3B illustrates a variation of the embodiment illustrated in FIG. 3A. As FIG. 3B shows, the lamp 210 is held between the upper arm 300 and the lower arm 500. The distal end 320 extends from the base 200 and its extending direction with respect to the projection plane 220 is defined as the first direction 700. The lower arm 500 extends from the base 200 and its extending direction on the projection plane 220 is defined as the second direction 710', wherein the first direction 700 and the second direction 710' are substantially perpendicular to each other. As FIG. 3B shows, the lower arm 500 is disposed between the upper arm 300 and the base 200, wherein the second direction 710' is substantially parallel with the extending direction of the lamp 210 while the first direction 700 is substantially perpendicular to the extending direction of the lamp 210. Furthermore, the base 200 consists of two portions substantially perpendicular to each other and the extending direction of the lamp 210 can be parallel with either one of the two portions. The upper arm 300 and the lower arm 500 are connected to different locations of the base 200, but are not limited thereto. The shape, location and distribution of the upper arm 300 and the lower arm 500 with respect to the base 200 can be adjusted if required. Furthermore, the second protrusion 511 illustrated in FIG. 3B has a strip shape and is distributed in a direction parallel to the lower arm 500, on one end of the lower arm 500.

Figure 4A:
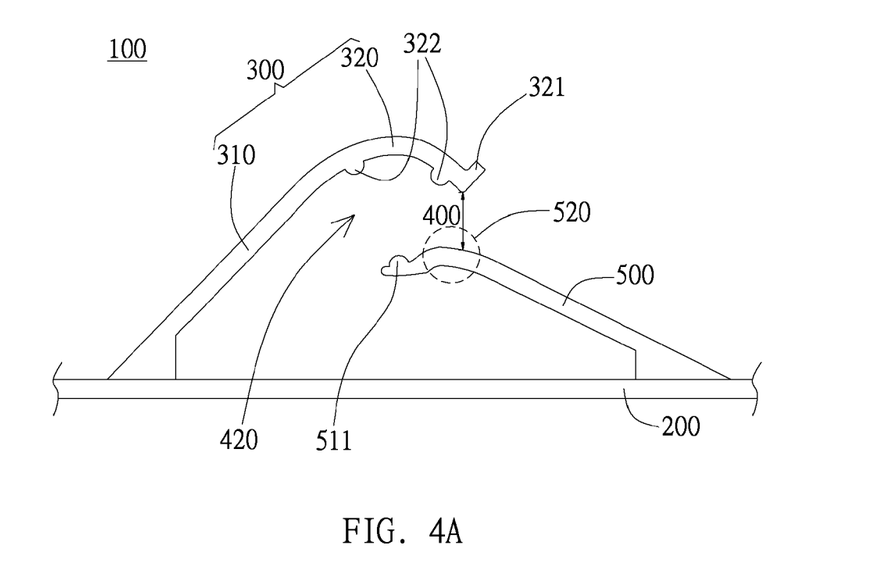
FIG. 4A illustrates a side view of another preferred embodiment of the lamp-positioning device of the present invention, wherein the upper arm is a cantilever.
Figure 4B:
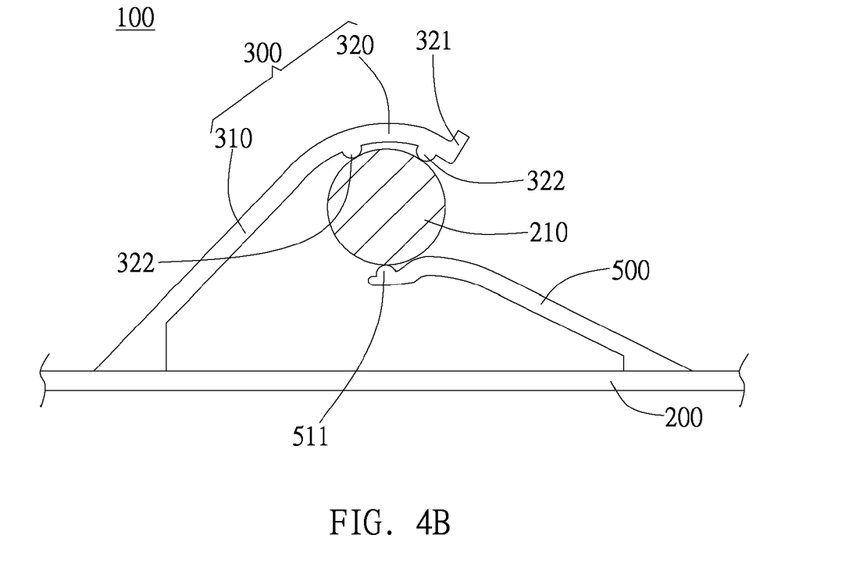
FIG. 4B illustrates another side view of the lamp-positioning device illustrated in FIG. 4A, wherein a lamp is held by the lamp-positioning device.

FIG. 4A and FIG. 4B illustrate another preferred embodiment of the lamp-positioning device 100 of the present invention. As FIG. 4A and FIG. 4B show, the upper arm 300 is a cantilever extending obliquely from the base 200. The angle of the upper arm 300 extending from the base 200 is preferably greater than the angle of the lower arm 500 extending from the base 200. In preferred embodiment, an angle between the lower arm 500 and the base 200 is substantially between 10° and 50°. An angle between the stand 310 of the upper arm 300 and the base 200 is substantially between 20° and 70°, but is not limited thereto. The stand 310 can extend from the base 200 in other angles smaller than or equal to 90°. Otherwise, the upper arm 300, lower arm 500 and the base 200 are substantially identical to the ones described above and thus will not be described here again.

Figure 5A:
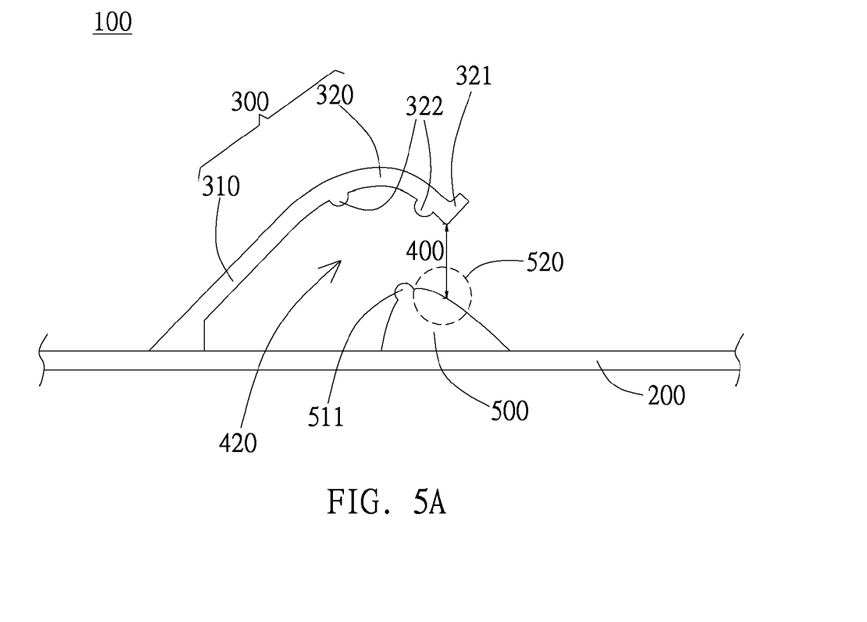
FIG. 5A illustrates another preferred embodiment of the lamp-positioning device of the present invention, wherein the lower arm is a bump formed on the base.
Figure 5B:
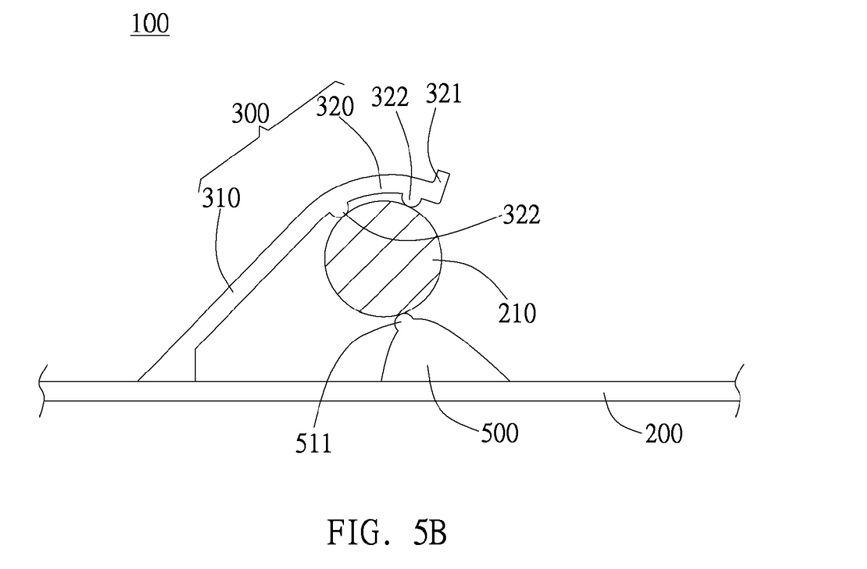
FIG. 5B is a side view of the lamp-positioning device illustrated in FIG. 5A, wherein a lamp is held by the lamp-positioning device.

FIG. 5A and FIG. 5B illustrate a variation of the embodiment illustrated in FIG. 4A and FIG. 4B. As FIG. 5A and FIG. 5B show, the lower arm 500 is a bump formed on the base 200. In the present embodiment, the lower arm 500 has a hemispherical shape but is not limited thereto. In the present embodiment, the lower arm 500 can also have elliptic shape or other suitable shapes. A second protrusion 511 is formed on the top of the lower arm 500, but is not limited thereto. The second protrusion 511 can be disposed on the slanting surface of the lower arm 500 or on other suitable part of the lower arm 500. The lamp port 400 is formed between the distal end 320 and the bulge portion 520 of the lower arm 500, for the lamp 210 to pass through and then enters the holding space 420. The lamp 210 also contacts the first protrusions 322 and the second protrusion 511 to be held by the lamp-positioning device 100. Otherwise, the upper arm 300 and the base 200 are substantially identical to the ones described above and thus will not be described here again.

Figure 6:
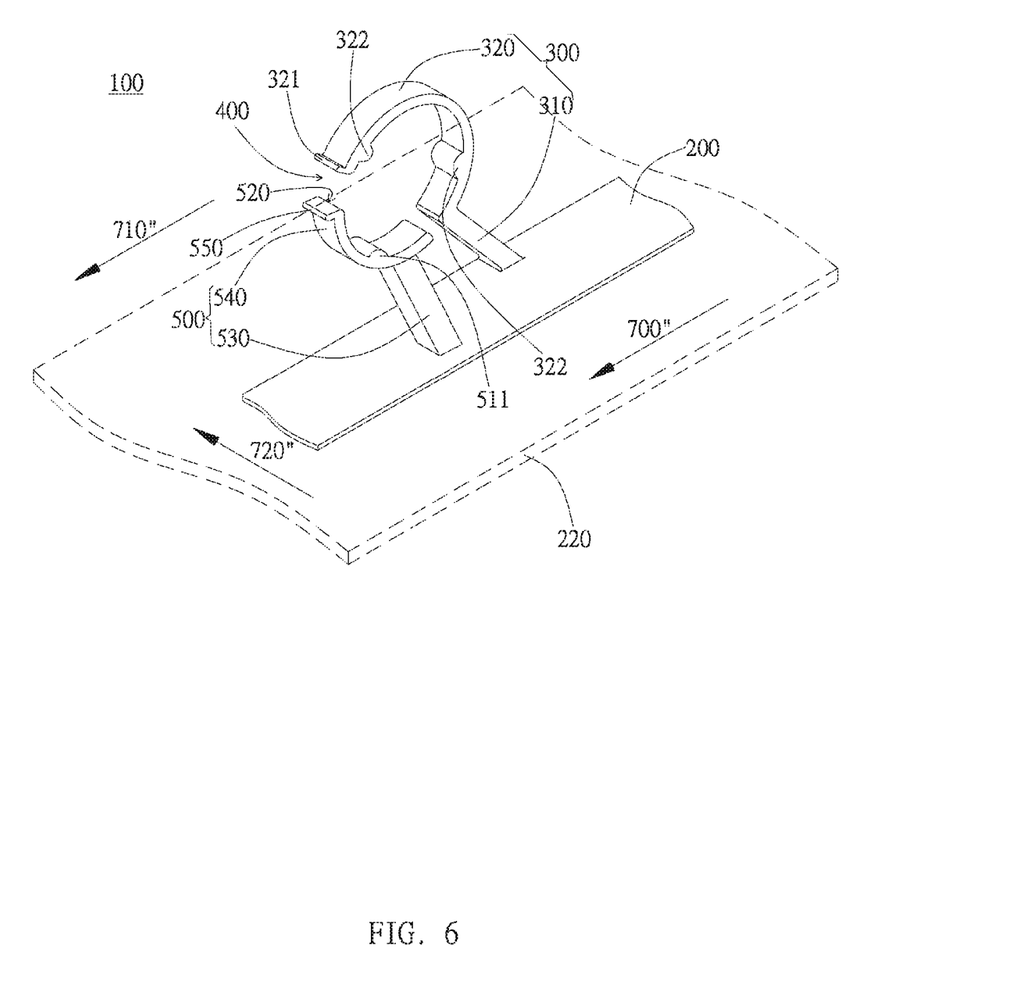
FIG. 6 illustrates yet another preferred embodiment of the lamp-positioning device of the present invention, wherein the upper arm is a cantilever.

FIG. 6 illustrates another preferred embodiment of the lamp-positioning device 100 of the present invention. In the present embodiment, the distal end 320 of the upper arm 300 has a concave curvature. The first protrusion 322 is disposed on the inner surface of the distal end 320 having concave curvature. The lower arm 500 includes a body 530 and a supporting part 540, wherein the body 530 extends from the base 200. One end of the body 530 is connected to the base 200 while the other end is connected to the supporting part 540. According to design requirements, the body 530 can be adjusted to extend perpendicularly from base 200 or in different angles. The supporting part 540 has a concave curvature and the concave inner surface of the supporting part 540 faces the concave inner surface of the distal end 320 of the upper arm 300. In preferred embodiment, the supporting part 540 and the distal end 320 form a circular space, but are not limited thereto. The supporting part 540 and the distal end 320 can form space of other shapes suitable for accommodating a lamp. Furthermore, the supporting part 540 further includes a second guiding surface 550 connected to one end of the supporting part 540 and corresponding to the first guiding surface 321 of the distal end 320. In preferred embodiment, the first guiding surface 321 can extend obliquely and away from the base 200 while the second guiding surface 550 can extend obliquely toward the base 200. However, the extending direction and the slope of the first guiding surface 321 and those of the second guiding surface 550 are not limited to the above description. Distance between the tip of the first guiding surface 321 and the tip of the second guiding surface 550 is slightly greater or equal to the diameter of the lamp. In this way, the lamp can be easily guided to pass through the lamp port 400.

Furthermore, by taking the projection plane 220 parallel with the base 200 as reference, the direction of the upper arm 300 extending from the base 200 is defined as the first direction 700". Similarly, the direction of the lower arm 500 extending from the base 200 is defined as the third direction 720". The supporting part 540 extends according to the second direction 710" which is perpendicular to the third direction 720" of the body 530. In other words, with reference to the projection plane 200, the extending directions of the body 530 and the supporting part 540 can be different and substantially perpendicular to each other. The extending direction (third direction 720") of the body 530 is perpendicular to the extending direction (first direction 700") of the upper arm 300. In different embodiments, third direction 720" of the body 530 can also be parallel with the first direction 700" of the upper arm 300.

Figure 7A:
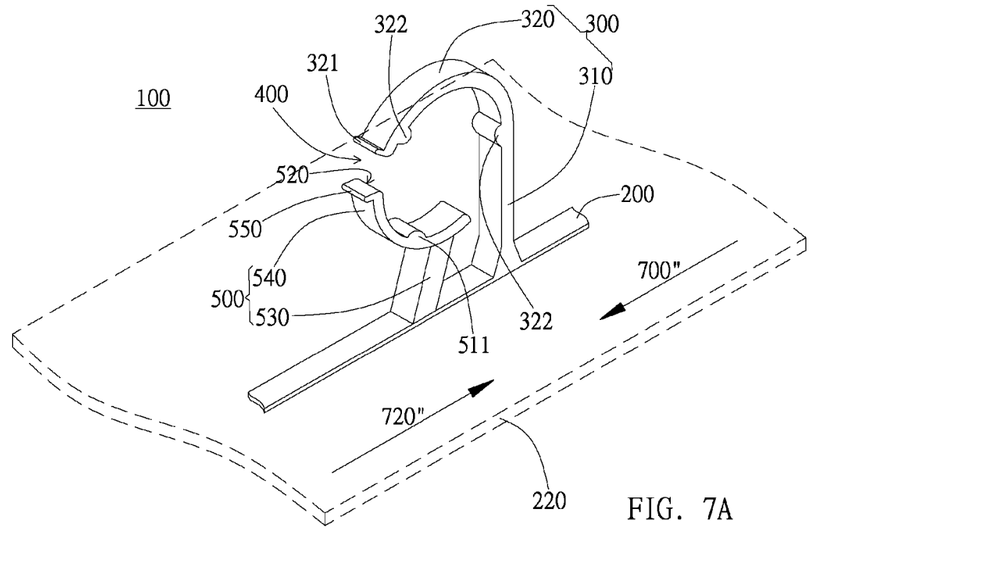
FIG. 7A illustrates a variation of the lamp-positioning device illustrated in FIG. 6.

FIG. 7A illustrates a variation of the embodiment illustrated in FIG. 6, wherein the body 530 of the lower arm 500 is disposed between the supporting part 540 and the base 200. Furthermore, the body 530 extends substantially obliquely from the base 200 and toward the inner surface of the upper arm 300. By taking the projection plane 220 parallel with the base 200 as reference, the extending direction of the body 530 (third direction 720") is parallel with the extending direction of the upper arm 300 (first direction 700"). The first direction 700" and the third direction 720" are parallel and collinear, but are not limited thereto. In different embodiments, the third direction 720" and the first direction 700" can be regarded as two parallel but not collinear lines on the projection plane 220.

Figure 7B:
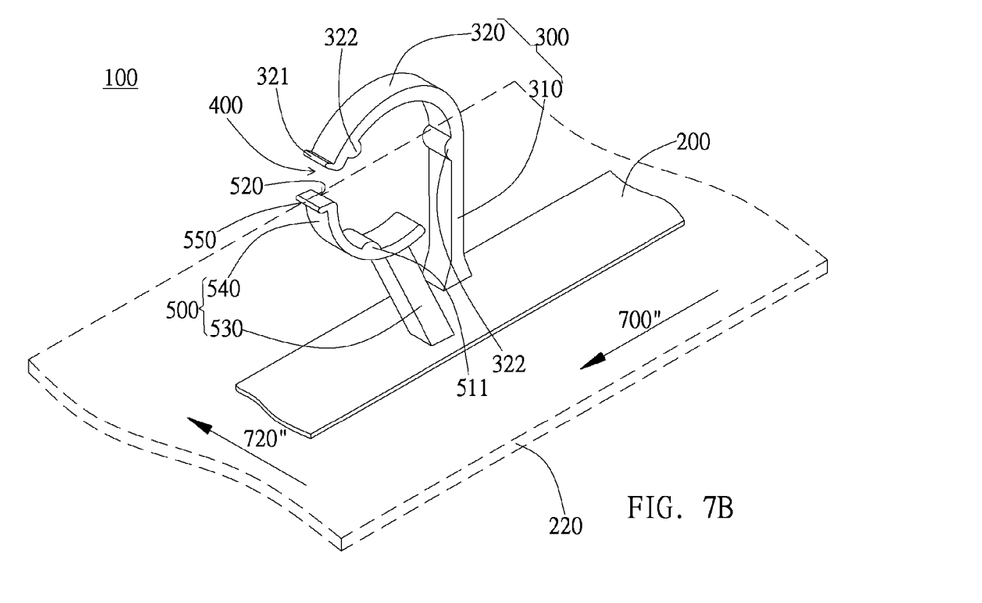
FIG. 7B illustrates yet another variation of the lamp-positioning device illustrated in FIG. 7A.

FIG. 7B illustrates yet another variation of the embodiment illustrated in FIG. 7A. In the present embodiment, the body 530 of the lower arm 500 extends in the third direction 720" from the base 200. Thus the extending direction of the body 530 (third direction 720") is substantially perpendicular to the extending direction of the upper arm 300 (first direction 700"). Otherwise, the upper arm 300 illustrated in FIG. 7B is identical to the upper arm 300 of the embodiment illustrated in FIG. 7A and the lower arm 500 illustrated in FIG. 7B is identical to the lower arm 500 of the embodiment illustrated in FIG. 6. Thus explanation will not be repeated here.

Figure 8:
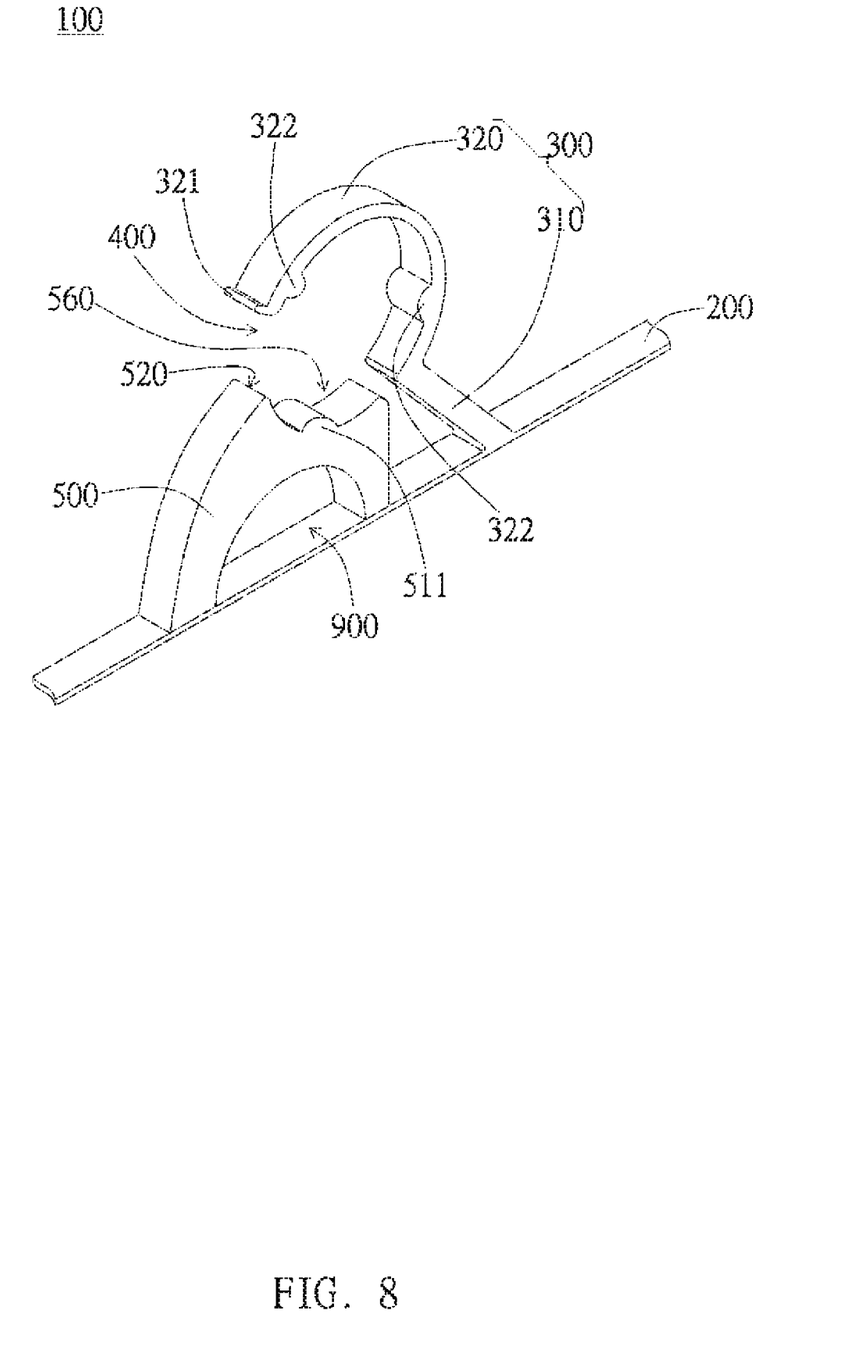
FIG. 8 illustrates another preferred embodiment of the lamp-positioning device, wherein the lower arm forms an arch structure.

FIG. 8 illustrates another preferred embodiment of the present invention. As FIG. 8 shows, two ends of the lower arm 500 are connected to the base 200 and form an arch. In the present embodiment, a semi-circular space is formed between the lower arm 500 and the base 200. The semi-circular space provides the lamp-positioning device 100 with cushion and elasticity, but is not limited thereto. In different embodiments, the space between the lower arm 500 and the base 200 can have other shapes. The space between the lower arm 500 and the base 200 can be partially filled or completely filled and connected to the base 200. The space between the lower arm 500 and the base 200 can be filled with the material used to make the lamp-positioning device or other materials having better elasticity, but is not limited thereto; people skilled in the art can adjust the way that the lower arm 500 is connected to the base 200 by changing the manufacture method, use of different materials or other methods according to actual design requirements. The lower arm 500 includes a bulge portion 520 corresponding to the distal end 320 of the upper arm 300 and a lamp port 400 is formed between them. The lower arm 500 further includes a concave 560 and a second protrusion 511 disposed on the concave 560. Otherwise, the upper arm 300 of the present embodiment is identical to the one illustrated in FIG. 6 and thus explanation will not be repeated here.

Figure 9:
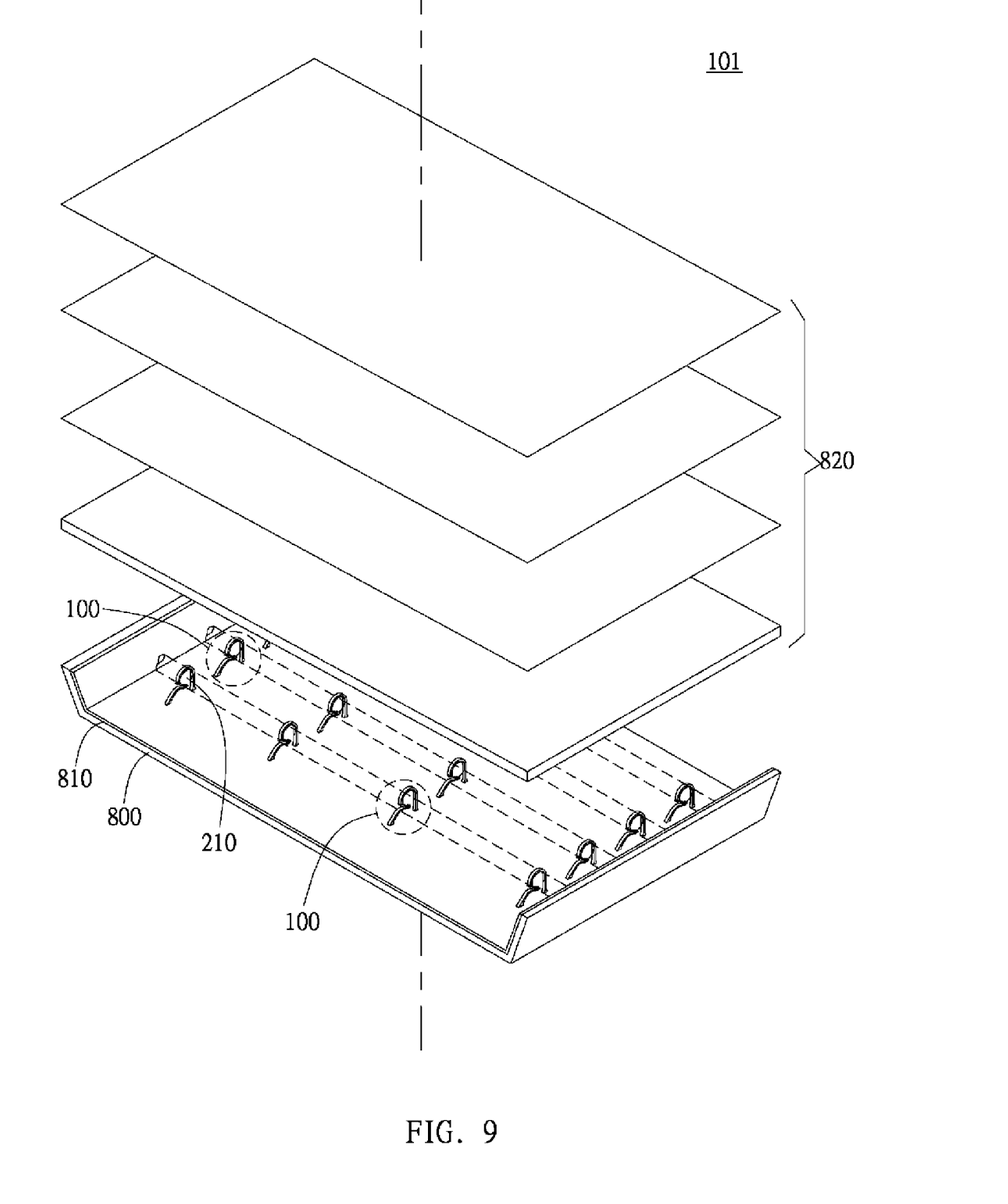
FIG. 9 is a perspective view of the backlight module of the present invention.

FIG. 9 is a perspective view of the backlight module 101 in one preferred embodiment of the present invention. In the present embodiment, the backlight module 101 is preferably a bottom-lighting backlight module, but is not limited thereto. In different embodiments, the backlight module 101 can also be an edge-lighting backlight module. The backlight module of the present embodiment includes a casing 800, a reflector sheet 810 disposed on the inner surface of the casing 800, at least a lamp-positioning device 100, a plurality of lamps 210 and a plurality of optical films 820, wherein the lamp can be held in the lamp-positioning device 100. The casing 800 can be made of metals or plastics. The optical film 820 includes diffuser plate, diffuser film, a prism film, or combinations thereof, but is not limited thereto. The lamp-positioning device 100 illustrated in FIG. 2A and FIG. 2B are disposed on the inner surface of the casing 800 for holding and positioning lamp 210. The lamp-positioning device 100 can be locked or fastened on the casing 800 or disposed on the casing 800 using adhesives, but is not limited thereto. The lamp-positioning device 100 can be formed together with the casing 800 in one piece or fixed on the casing 800 using other methods. The base of the lamp-positioning device 100 can thus be replaced by the casing 800. In other words, the upper arm and the lower arm of the lamp-positioning device 100 can be formed directly on the casing 800. Furthermore, if the casing 800 has a reflective surface or is made of reflective material, then the reflector sheet 810 can be omitted. In the embodiment illustrated in FIG. 9, extra lamp-positioning devices 100 are disposed on the middle section of the casing 800 in order to improve the stability of the lamp 210. Furthermore, as the length of lamp 210 increases, the number of lamp-positioning device 100 may also increase in accordance with the length of lamp 210. However, in different embodiments, the lamp-positioning device 100 can be formed on the opposite lateral sides of the casing 800 in order to hold two ends of the lamp 210. People with ordinary skill and knowledge in the field can adjust the number of lamp-positioning devices 100 used, positions on the casing 800, distribution pattern and connection methods.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A lamp-positioning device, comprising:
   a base;
   an upper arm having one end extending from the base, wherein the upper arm has a free distal end arching over the base; and
   a lower arm having one end connected to the base and the other end extending out under the distal end of the upper arm, the lower arm has a bulge portion together with the distal end of the upper arm forming a lamp port;
   wherein the upper arm and the lower arm are connected to different locations of the base, at least one of the upper arm and the lower arm is elastic, the upper arm includes at least one first protrusion on the distal end and the lower arm includes at least one second protrusion on the lower arm for contacting the lamp.

2. The lamp-positioning device of claim 1, wherein the upper arm extends from the base in a direction substantially perpendicular to the base.

3. The lamp-positioning device of claim 1, wherein on a projection plane parallel to the base, the upper arm extends from the base toward the lamp port in a direction different from that of the lower arm extending from the base toward the lamp port.

4. The lamp-positioning device of claim 1, wherein the upper arm is substantially parallel to the lower arm on a projection plane parallel to the base.

5. The lamp-positioning device of claim 1, wherein the upper arm is substantially perpendicular to the lower arm on a projection plane parallel to the base.

6. The lamp-positioning device of claim 1, wherein the distal end of the upper arm further includes a first guiding surface corresponding to the lamp port.

7. The lamp-positioning device of claim 1, wherein the other end of the lower arm opposite to the one end connecting to the base extends to form an arch structure.

8. The lamp-positioning device of claim 1, wherein a buffer zone is formed between the lower arm and the base, an elastic material is selectively disposed in the buffer zone.

9. The lamp-positioning device of claim 1, wherein the at least one first protrusion and the at least one second protrusion are distributed in a circle, an angle between every two adjacent protrusions is less than 180 degree with respect to a center of the circle.

10. The lamp-positioning device of claim 1, wherein the lower arm is a cantilever extending between the distal end of the upper arm and the base.

11. The lamp-positioning device of claim 1, wherein the lower arm is a bump formed on the base.

12. The lamp-positioning device of claim 1, wherein the lower arm includes:
   a body having one end connected to the base; and
   a supporting part connected to the other end of the body, wherein the supporting part has a concave curvature with respect to the upper arm.

13. The lamp-positioning device of claim 12, wherein the upper arm is substantially perpendicular to the body of the lower arm on a projection plane parallel to the base.

14. The lamp-positioning device of claim 12, wherein the body is substantially perpendicular to the supporting part on a projection plane parallel to the base.

15. The lamp-positioning device of claim 12, wherein the supporting part further includes a second guiding surface connected to the bulge portion and corresponding to the lamp port.

16. The lamp-positioning device of claim 1, wherein an angle between the lower arm and the base is substantially between 10° and 50°.

17. The lamp-positioning device of claim 1, wherein an angle between the upper arm and the base is substantially between 20° and 70°.

18. The lamp-positioning device of claim 1, wherein an angle between the upper arm and the base is greater than an angle between the lower arm and the base.

19. A backlight module, comprising:
   a lamp;
   a lamp-positioning device including:
      a base;
      an upper arm having one end extending from the base, wherein the upper arm has a free distal end arching over the base; and
      a lower arm having one end connected to the base and the other end extending out to be under the distal end of the upper arm, wherein the lower arm has a bulge portion together with the distal end of the upper arm forming a lamp port;
   wherein the upper arm and the lower arm are connected to different locations of the base, at least one of the upper arm and the lower arm is elastic, the upper arm includes at least one first protrusion on the distal end and the lower arm includes at least one second protrusion on the lower arm for contacting the lamp.

20. The backlight module of claim 19, wherein the base serves as a housing of the backlight module.

21. A lamp-positioning device, comprising:
   a base;
   an upper arm having one end extending from the base, wherein the upper arm has a free distal end arching over the base; and
   a lower arm having one end connected to the base and the other end extending out under the distal end of the upper arm, the lower arm has a bulge portion together with the distal end of the upper arm forming a lamp port;
   wherein the upper arm and the lower arm are connected to different locations of the base, both the upper arm and the lower arm are elastic and have a degree of freedom of displacement.

22. A backlight module, comprising:
   a lamp;
   a lamp-positioning device including:
      a base;
      an upper arm having one end extending from the base, wherein the upper arm has a free distal end arching over the base; and
      a lower arm having one end connected to the base and the other end extending out to be under the distal end of the upper arm, wherein the lower arm has a bulge portion together with the distal end of the upper arm forming a lamp port;
   wherein the upper arm and the lower arm are connected to different locations of the base, both the upper arm and the lower arm are elastic and have a degree of freedom of displacement.

* * * * *